United States Patent
Röhm et al.

(10) Patent No.: US 6,575,478 B2
(45) Date of Patent: Jun. 10, 2003

(54) DRILL CHUCK WITH CUSHIONED FULL-OPEN POSITION

(75) Inventors: Günter Horst Röhm, Sontheim (DE); Hans-Dieter Mack, Sontheim (DE)

(73) Assignee: Rohm GmbH, Sontheim (DE)

( * ) Notice: Subject to any disclaimer, the term of this patent is extended or adjusted under 35 U.S.C. 154(b) by 0 days.

(21) Appl. No.: 10/067,575

(22) Filed: Feb. 5, 2002

(65) Prior Publication Data

US 2002/0109307 A1 Aug. 15, 2002

(30) Foreign Application Priority Data

Feb. 10, 2001 (DE) .......................... 101 06 251

(51) Int. Cl.$^7$ ............................... B23B 31/12
(52) U.S. Cl. ........................... 279/62; 279/902
(58) Field of Search .................. 279/61, 60, 62, 279/63, 64, 65, 902, 140; 408/240

(56) References Cited

U.S. PATENT DOCUMENTS

| | | | | |
|---|---|---|---|---|
| 5,174,588 A | * | 12/1992 | Reibetanz et al. | 279/62 |
| 5,411,275 A | * | 5/1995 | Huff et al. | 279/62 |
| 5,431,420 A | * | 7/1995 | Huff et al. | 279/62 |
| 5,816,582 A | * | 10/1998 | Steadings et al. | 279/62 |
| 6,070,884 A | * | 6/2000 | Mack | 279/62 |

* cited by examiner

*Primary Examiner*—Steven C. Bishop
(74) *Attorney, Agent, or Firm*—Herbert Dubno; Andrew Wilford

(57) ABSTRACT

A chuck body is formed with angled guides holding respective jaws. A tightening ring rotatable about the axis on the chuck body has a screwthread meshing with toothed edges of the jaws so that rotation of the ring in one direction moves the jaws axially forward and radially together and opposite rotation moves the jaws axially rearward and radially apart. A spring washer is rotatable about the axis on the body between the tightening ring and the rear jaw faces. Rearwardly directed jaw faces axially rearwardly engage and press the washer toward the tightening ring and coupling formations on the washer and ring angularly lock the washer to the ring when the washer is pressed axially rearward by the faces. Stops on the washer can engage the jaws for permitting only limited relative angular movement of the washer and jaws when the faces are pressed axially rearward against the washer.

9 Claims, 5 Drawing Sheets

DRILL CHUCK WITH CUSHIONED FULL-OPEN POSITION

FIELD OF THE INVENTION

The present invention relates to a drill chuck. More particularly this invention concerns a multiple-jaw chuck used on a power drill.

BACKGROUND OF THE INVENTION

A standard drill chuck has a chuck body adapted to be rotated by a power unit about an axis and formed with a plurality of angularly equispaced and angled guides. Jaws in the guides have outer edges formed with teeth meshing with an internal screwthread of a tightening ring axially fixed but rotatable on the chuck body. Typically the ring is formed as a two-part machined casting that is held together by an annularly continuous tightening sleeve slipped axially over it and fixed to it. Rotation of the ring and sleeve in one direction moves the jaws axially forward and radially together, and opposite rotation moves them back and apart.

Typically the tightening ring is set in a radially outwardly open groove of the chuck body with axially forwardly and axially rearwardly directed faces of the groove confronting the ends of the ring. The ring bears axially backward via a roller bearing.

When the jaws move axially backward they reach an end position in which the ring engages an unthreaded portion of the jaws and can no longer rotate. It is, unfortunately, fairly common for the tool operator to dechuck a tool by solidly gripping the sleeve to arrest it and then reverse rotating the chuck body by means of the power unit of the drill, so that the rear-end position is reached rapidly and the ring and jaws jam together.

Even if it is possible to unjam the chuck once this happens, with time this style of operation leads to damage to the threads of the tightening ring. The chuck becomes loose and sloppy.

It has been suggested to provide a spring washer between rear faces of the jaws and the tightening ring. This is a partial solution which avoids some damage to the jaws and ring, but that still can let the chuck jam when moved very rapidly into the fully open position. Even with this system, it is the jamming of the tightening-ring screwthread and the jaw teeth that stop opening action, and this jamming is certain to wear down these parts with time.

OBJECTS OF THE INVENTION

It in therefore an object of the present invention to provide an improved drill chuck.

Another object is the provision of such an improved drill chuck which overcomes the above-given disadvantages, that is which does not jam or damage itself if its jaws are moved brusquely into the rear-end position.

SUMMARY OF THE INVENTION

A chuck has according to the invention a chuck body rotatable about an axis and formed with a plurality of angularly spaced and forwardly open angled guides holding respective jaws each having a toothed edge and an axially rearwardly directed face. A tightening ring rotatable about the axis on the chuck body is axially relatively nondisplaceable on the chuck body and has a screwthread meshing with the toothed edges of the jaws so that rotation of the ring in one direction moves the jaws axially forward and radially together and opposite rotation moves the jaws axially rearward and radially apart. A spring washer is rotatable about the axis on the body between the tightening ring and the rear jaw faces. The jaw faces are axially rearwardly engageable with the washer to press same toward the tightening ring and coupling formations on the washer and an the ring prevent relative rotation of the washer and the ring when the washer is pressed axially rearward by the faces against the ring. Stop formations on the washer are engageable with the jaws for permitting only limited relative angular movement of the washer and jaws when the faces are pressed axially rearward against the washer.

The spring washer therefore does basically nothing when the jaws are not at or near their fully retracted positions, because the jaw faces are normally out of contact with the spring washer. In fact the spring washer normally is free to rotate about the chuck body. When, however, the jaws are retracted sufficiently to press the spring washer against the tightening ring, this action first locks the spring washer to the tightening ring, and then prevents further relative rotation of the jaws, which are rotational with the chuck body, and the spring washer, which is rotational with the tightening ring that itself is fixed to the standard external tightening sleeve. Thus instead of the jaws bottoming out in the threads of the tightening ring to end relative rotation between the tightening ring and the chuck body, the spring washer engages between the jaws and the tightening ring. This not only protects the somewhat more delicate structure of the jaw teeth and tightening-ring screwthread, but also puts between the jaws and the tightening ring a spring element that is unlikely to bind or jam. Subsequent advance of the jaws is easy as the spring washer in fact will exert a spring force in the appropriate direction. The spring washer angularly couples the chuck body to the tightening ring before the jaws move so far back that the jaw teeth bottom in the tightening-ring screw-thread, so that this structure is not damaged and, when the chuck is to be tightened, the screwthread and jaw teeth are not jammed together.

The coupling formations according to the invention include an axially projecting bump and an axially open seat in which the bump is receivable. More particularly, the bump is formed on the spring washer and the seat on the tightening ring. In fact the spring washer is formed with a plurality of the stop bumps and the ring is formed with a complementary plurality of the seats.

The stop formations according to the invention similarly include at least one axially forwardly projecting bump formed on the washer and angularly engageable with at least one of the jaws. More particularly the jaws are angularly equispaced and for each of the jaws there is a respective one of the stop bumps which themselves are angularly equispaced. Thus all of the jaws will bear angularly via the respective stop bumps on the spring washer which will in turn bear angularly via the coupling bumps on the tightening ring.

According to the invention a spring ring bears axially rearwardly on a shoulder of the chuck body that engages at most over half of the washer's radial dimension. The tightening ring bears in turn radially backward on the spring ring at a location radially outward of the shoulder 80 that the spring ring can be deformed elastically by axial rearward pressure of the tightening ring on the spring ring. In practice it has been found advantageous when the shoulder engages over only about one-quarter of the radial dimension of the spring ring, to maximize the extent to which the outer periphery of the spring ring can be elastically deformed and thereby maximize the spring effect. In any case bearing balls engage axially between the tightening ring and the spring ring, and the spring ring has a front face formed as a track for the balls.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
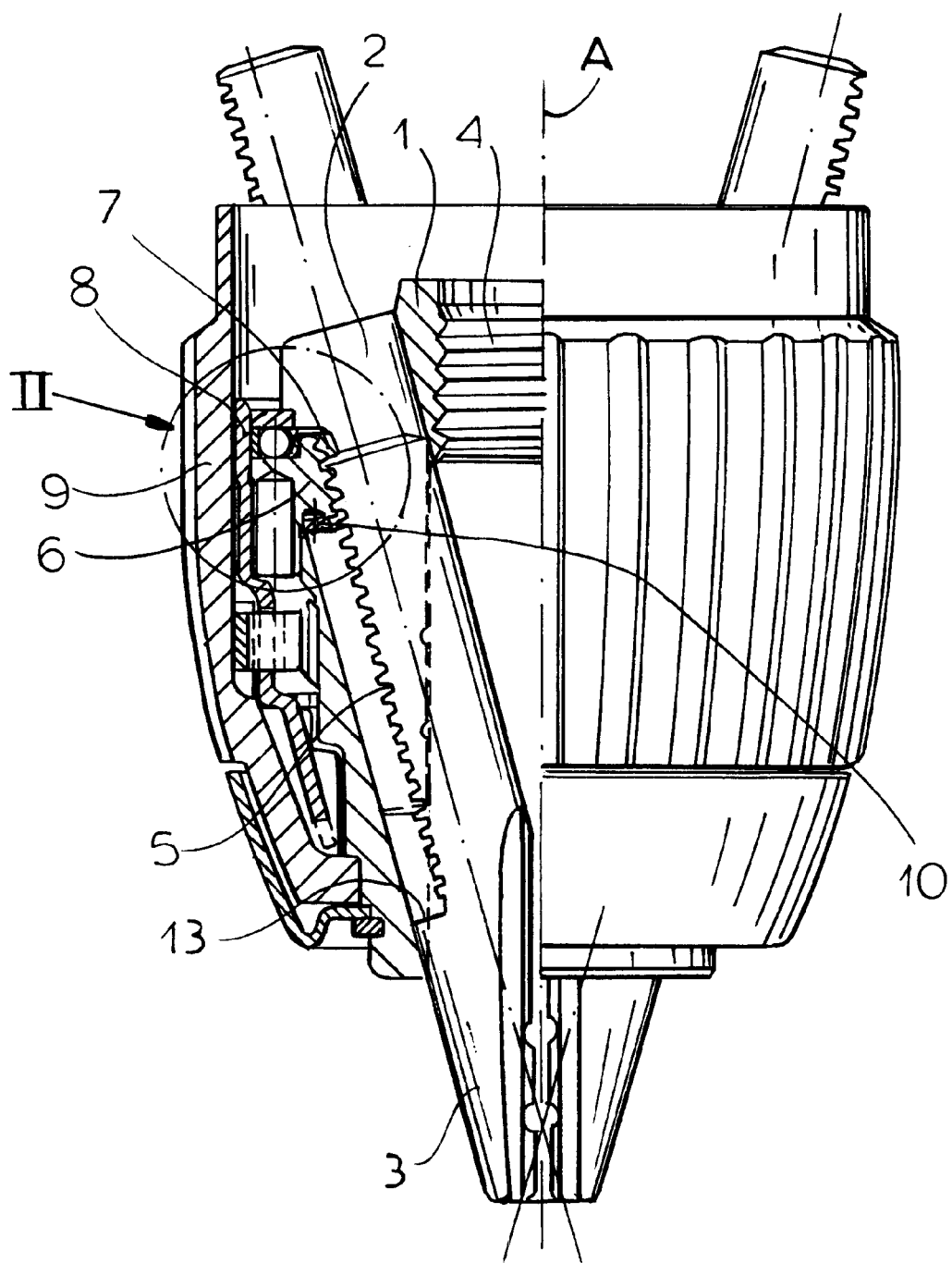
FIG. 1 is a side view partly in axial section through a chuck according to the invention with the jaws retracted nearly fully.
Figure 2:
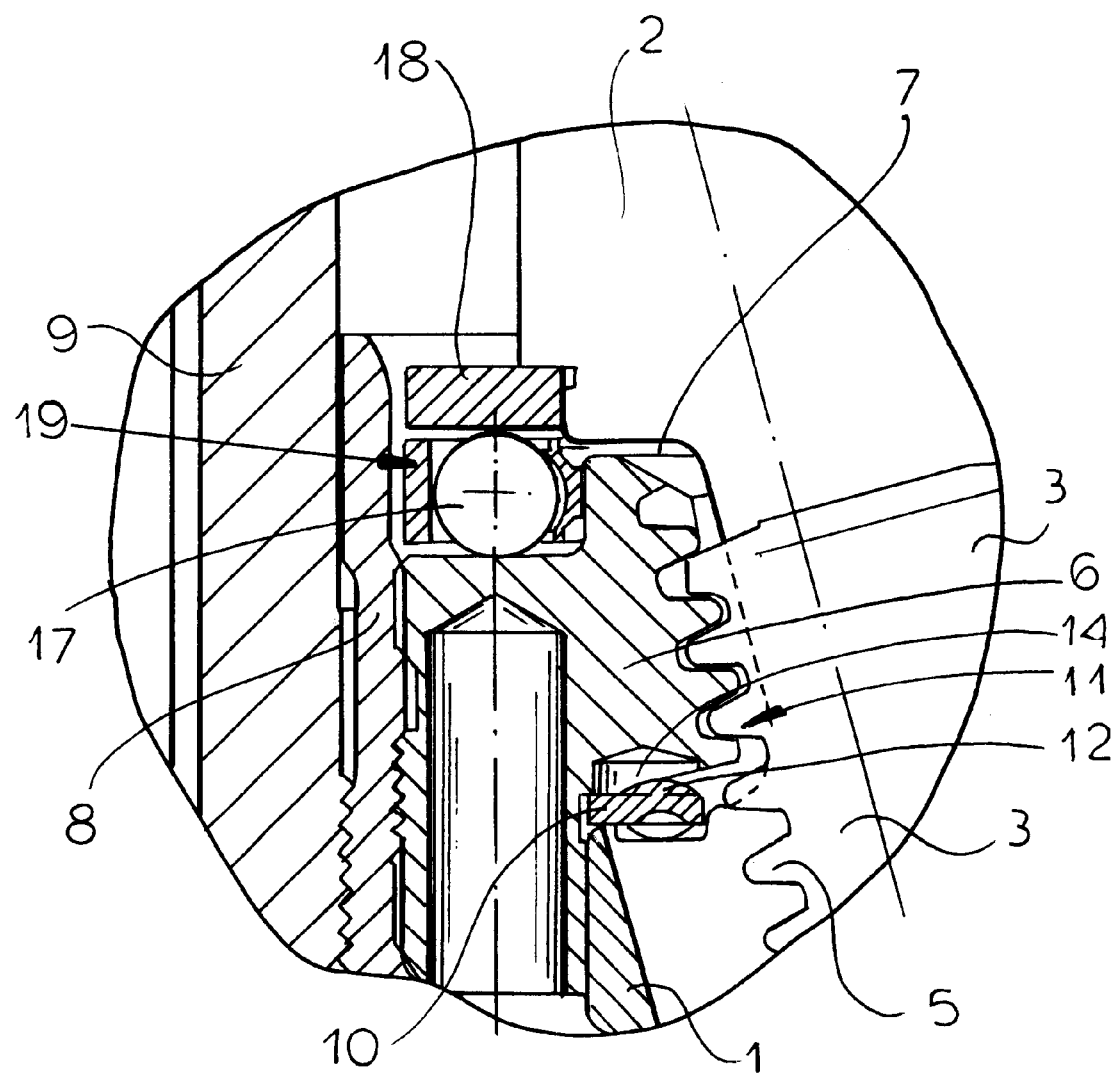
FIG. 2 is a large-scale view of the detail indicated at II in FIG. 1.
Figure 3:
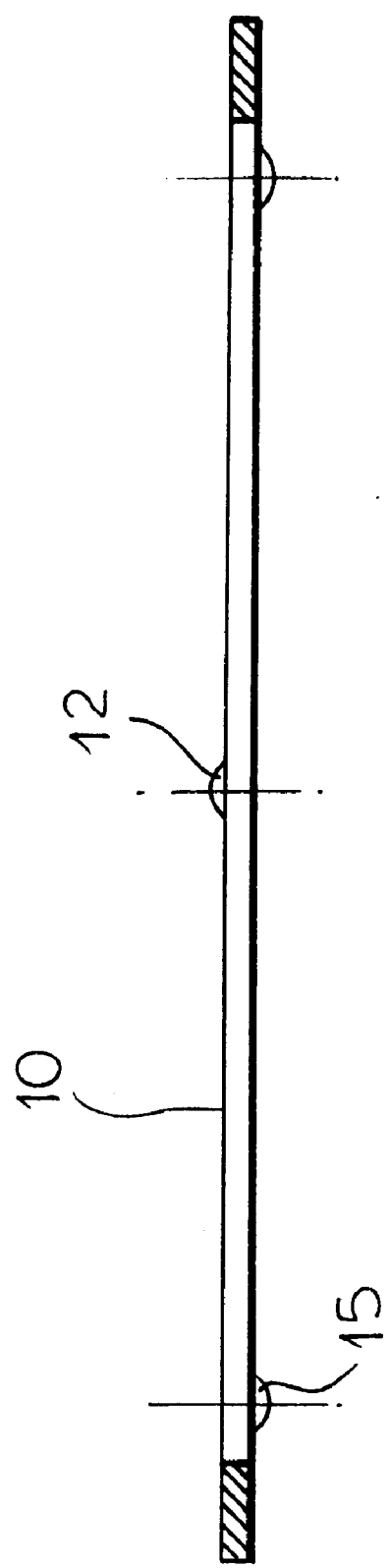
FIG. 3 is an axial section through the spring washer of the chuck.
Figure 4:
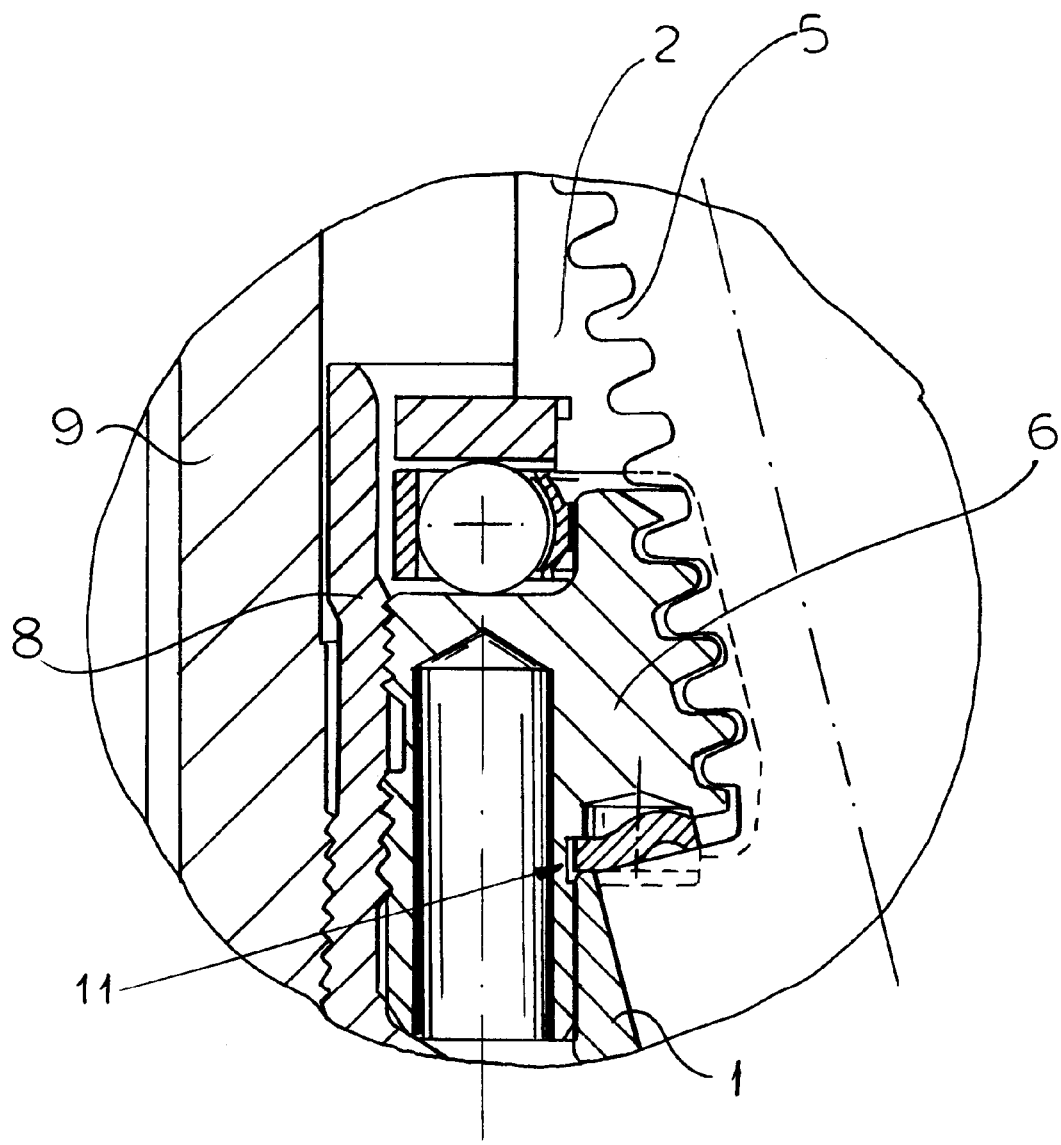
FIG. 4 is a view like FIG. 2 of the chuck but with the jaws retracted fully.

As seen in FIGS. 1 through 4 a chuck according to the invention has a chuck body 1 centered on axis A and formed with an axially throughgoing passage 4 and three angled guides 2. The passage 4 is threaded at its rear end to receive the spindle of a power unit. The guides 2 are angled, open into a front end of the passage 4, and each receive a respective jaw 3 that can slide axially forward and radially together or axially backward and radially apart to grip and release a tool whose shank is inserted into the front end of the passage 4.

Each jaw 5 has an outer edge formed with a row of angled teeth 5 meshing with an internal screwthread of a tightening ring 6. This ring 6 is formed of two semicircular parts that are set in a radially outwardly open groove 7 of the body 1 and that then are secured together by a holding sleeve 8 in turn gripped in a tightening sleeve 9 that can rotate on the body 1 to move the jaws 3 forward and back in the manner well known in the art. The ring 6 bears axially rearward via rollers 17 of a roller bearing 19 on a spring ring 16 bearing in turn against an axially forwardly facing annular shoulder 18 of the body 1.

According to the invention a spring washer 10 is provided between rearwardly directed shoulders 13 formed on the jaws 3 and an axially forwardly directed front face of the ring 6. This spring washer 10 has a rear surface formed with a plurality of part-spherical and axially rearwardly projecting coupling bumps 12 engageable in axially forwardly directed and angularly limited seats 14 formed in the front face of the ring 6 and forming a coupling 11 between the washer 10 and the ring 6. Since the ring 6 is normally formed of two parts, there are normally two coupling bumps 12 and two seats 14. The washer 10 also is formed with three angularly equispaced and forwardly projecting part-spherical stop bumps 15.

The coupling 11 serves, when the jaws 3 are retracted, to couple the washer 10 to the ring 6 and the stop bumps 15 serve to limit relative angular displacement between the washer 10 and the jaws 3 and, hence, between the ring 6 and the body 1. More particularly, as the jaws 3 move backward first their back faces 13 will contact the front face of the washer 10 and press it backward. The washer 10 will rotate freely relative to the ring 6 until the coupling bumps 12 push into the seats 14, whereupon the washer 10 will no longer rotate relative to the ring 6. The jaws 3 will continue to slide until they radially engage the respective stop bumps 15, in which case relative rotation between the parts 6, 8, and 9 on one hand and 1 and 3 on the other will stop.

This action will leave the spring washer 10 deformed elastically, but will not jam the jaws 3 into the threads of the ring 6. Thus the rotation of the outer parts 6, 8, and 9 will be stopped gently, and the spring action will make it relatively easy to close the chuck again.

Figure 5:
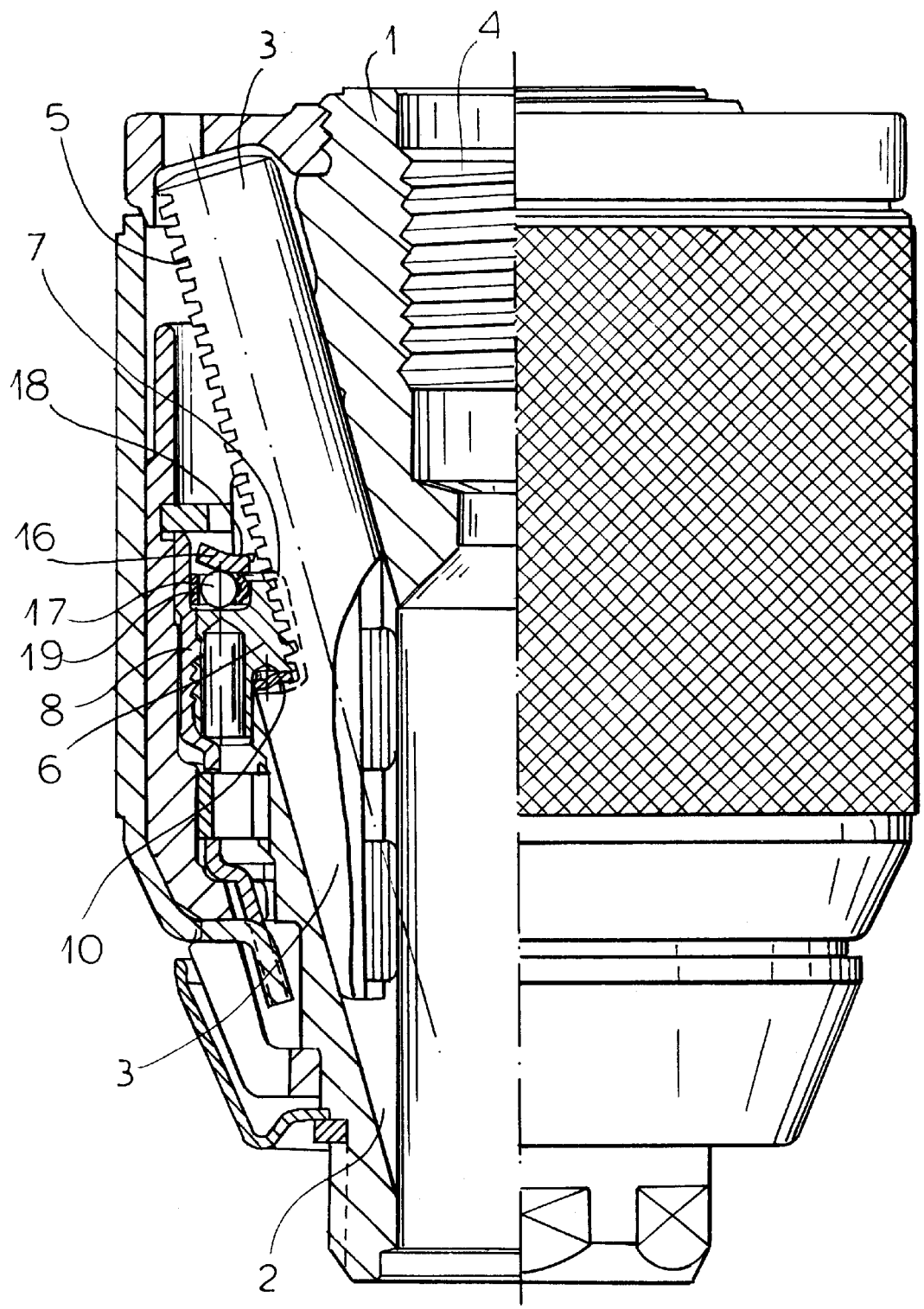
FIG. 5 is a view like FIG. 1 showing an alternative system in accordance with the invention.

FIG. 5 shows how the spring ring 16 is elastically deformable and is only engaged over less than 50%, here 25%, of its radial dimension by the shoulder 17. The balls 17 engage the ring 16 somewhat outward from its center so it will be deformed elastically backward when the chuck is opened very brusquely, ensuring that when the parts stop they are not hopelessly jammed together, but instead are bearing via springs on each other so they can be readily separated again. The spring ring 16 in effect is formed as one of the races of the bearing 19.

We claim:

1. A chuck comprising:

a chuck body rotatable about an axis and formed with a plurality of angularly spaced and forwardly open angled guides;

respective jaws in the guides each having a toothed edge and an axially rearwardly directed face;

a tightening ring rotatable about the axis on the chuck body, axially relatively nondisplaceable on the chuck body, and having a screwthread meshing with the toothed edges of the jaws, whereby rotation of the ring in one direction moves the jaws axially forward and radially together and opposite rotation moves the jaws axially rearward and radially apart;

a spring washer rotatable about the axis relative to the body and to the tightening ring, the jaw faces being axially rearwardly engageable with the spring washer to press same toward the tightening ring;

means including coupling formations on the washer and on the ring for preventing relative rotation of the washer and the ring only when the washer is pressed axially rearward by the faces toward the ring; and means including stop formations on the washer and engageable with the jaws for permitting only limited relative angular movement of the washer and jaws only when the faces are engaged axially rearward against the washer.

2. The chuck defined in claim 1 wherein the coupling formations include an axially projecting bump and an axially open seat in which the bump is receivable.

3. The chuck defined in claim 2 wherein the bump is formed on the spring washer and the seat on the tightening ring.

4. The chuck defined in claim 3 wherein the spring washer is formed with a plurality of the stop bumps and the ring is formed with a complementary plurality of the seats.

5. The chuck defined in claim 1 wherein the stop formations include at least one axially forwardly projecting stop bump formed on the washer and angularly engageable with at least one of the jaws.

6. The chuck defined in claim 5 wherein the jaws are angularly equispaced and for each of the jaws there is a respective one of the stop bumps, the stop bumps also being angularly equispaced.

7. The chuck defined in claim 1, further comprising
a spring ring, the chuck body having a shoulder bearing axially forward on the spring ring and engaging at most over half of its radial dimension, the tightening ring bearing radially backward on the spring ring at a location radially outward of the shoulder, whereby the spring ring can be deformed elastically by axial rearward pressure of the tightening ring on the spring ring.

8. The chuck defined in claim 7 wherein the shoulder engages over only about one-quarter of the radial dimension of the spring ring.

9. The chuck defined in claim 7, further comprising
bearing balls engaged axially between the tightening ring and the spring ring, the spring ring having a front face formed as a track for the balls.

\* \* \* \* \*